United States Patent
Horne et al.

(10) Patent No.: US 7,371,717 B2
(45) Date of Patent: May 13, 2008

(54) PROCESS FOR PREPARING COATED ALKALI METAL PERCARBONATE, COATED ALKALI METAL PERCARBONATE OBTAINABLE BY THIS PROCESS, ITS USE IN DETERGENT COMPOSITIONS, AND DETERGENT COMPOSITIONS CONTAINING IT

(75) Inventors: Graham R. Horne, Warrington (GB); Alun P. James, Blundellsands (GB); Juan-Teva Carlier, Brussels (BE); Manfred Mathes, Bad Hoenningen (DE)

(73) Assignee: SOLVAY (Societe Anonyme), Brussels (BE)

( * ) Notice: Subject to any disclaimer, the term of this patent is extended or adjusted under 35 U.S.C. 154(b) by 382 days.

(21) Appl. No.: 10/203,624

(22) PCT Filed: Feb. 14, 2001

(86) PCT No.: PCT/EP01/01595

§ 371 (c)(1),
(2), (4) Date: Nov. 18, 2002

(87) PCT Pub. No.: WO01/62663

PCT Pub. Date: Aug. 30, 2001

(65) Prior Publication Data

US 2003/0158069 A1    Aug. 21, 2003

(30) Foreign Application Priority Data

Feb. 21, 2000    (EP) .................................. 00301327

(51) Int. Cl.
*C11D 7/08*    (2006.01)
*C11D 7/18*    (2006.01)
*C11D 7/54*    (2006.01)

(52) U.S. Cl. ...................... 510/441; 510/309; 510/375; 510/445

(58) Field of Classification Search ..................... None
See application file for complete search history.

(56) References Cited

U.S. PATENT DOCUMENTS

| | | | | |
|---|---|---|---|---|
| 5,312,557 A | * | 5/1994 | Onda et al. ................. | 510/309 |
| 5,332,518 A | * | 7/1994 | Kuroda et al. .............. | 510/309 |
| 5,366,655 A | * | 11/1994 | Yamashita et al. ..... | 252/186.27 |
| 5,556,834 A | * | 9/1996 | James et al. ................ | 510/375 |
| 5,658,873 A | * | 8/1997 | Bertsch-Frank et al. .... | 510/375 |
| 5,665,427 A | * | 9/1997 | Horne et al. ................ | 427/212 |
| 5,670,470 A | * | 9/1997 | Horne et al. ................ | 510/375 |
| 5,681,807 A | * | 10/1997 | Honig et al. ................ | 510/375 |
| 5,902,682 A | * | 5/1999 | Bertsch-Frank et al. .... | 428/403 |

(Continued)

FOREIGN PATENT DOCUMENTS

EP        0 405 797        1/1991

(Continued)

*Primary Examiner*—Gregory R. Del Cotto
(74) *Attorney, Agent, or Firm*—Oblon, Spivak, McClelland, Maier & Neustadt, P.C.

(57) ABSTRACT

A process for preparing coated particulate alkali metal percarbonate in which coating is carried out by mixing percarbonate with a solid particulate coating and agent and optionally with an aqueous liquid, so that the amount of water present during mixing does not exceed 12% of the total weight of the mixture. Coated alkali metal percarbonate obtainable by this process and its use as active bleach in detergent compositions is also disclosed.

28 Claims, 1 Drawing Sheet

Figure 1:
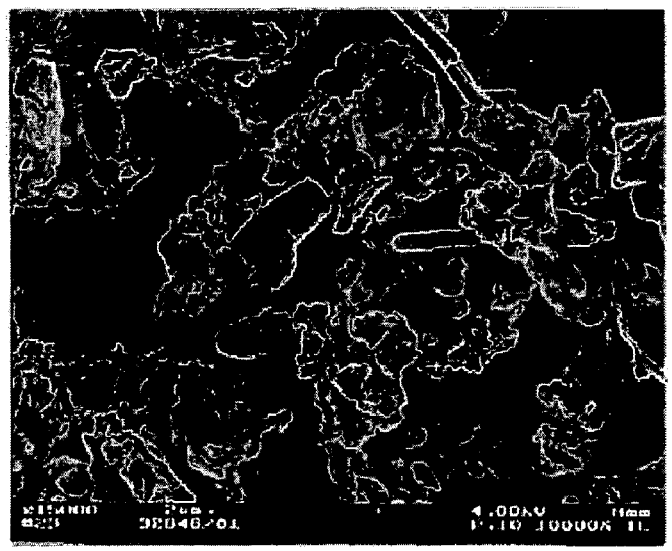

U.S. PATENT DOCUMENTS 6,231,828 B1 * 5/2001 James et al. .............. 423/415.2
2001/0014306 A1 * 8/2001 Horne et al. .............. 423/415.2

FOREIGN PATENT DOCUMENTS

| EP | 0 567 140 | 10/1993 |
| GB | 1 575 792 | 10/1980 |
| GB | 1575792 | * 10/1980 |
| WO | 94 14701 | 7/1994 |
| WO | 95/15292 | 6/1995 |
| WO | WO 98/30670 | * 7/1998 |

* cited by examiner

PROCESS FOR PREPARING COATED ALKALI METAL PERCARBONATE, COATED ALKALI METAL PERCARBONATE OBTAINABLE BY THIS PROCESS, ITS USE IN DETERGENT COMPOSITIONS, AND DETERGENT COMPOSITIONS CONTAINING IT

The present invention is related to a process for preparing coated alkali metal percarbonate and to the coated alkali metal percarbonate obtainable by this process. It is further related to the use of this coated alkali metal percarbonate in detergent compositions and to detergent compositions containing it.

It is known to use alkali metal percarbonate as bleaching compound in detergent powder mixtures. It is further known that alkali metal percarbonate decomposes quickly during storage in the powdered state. One way to stabilize alkali metal percarbonate is by coating it with boric acid. For instance, the British patent 1 575 792 describes the coating of sodium percarbonate with a solution of boric acid. This process however suffers from the following problem. Due to the limited solubility of boric acid, particularly at ambient temperature, it is necessary to use large volumes of coating solution or multiple coating steps to obtain a sufficient amount of boric acid on the surface of the percarbonate particles. A solution to this problem has been proposed in the international patent application WO 95/15292 wherein a solubilizing amount of a neutral salt is added in the coating solution to enable a greater weight of boric acid to be applied on the surface of the percarbonate.

The purpose of the present invention is to furnish a new process for the coating of percarbonate particles comprising a limited amount of process steps, which does not require the preparation of solutions and evaporation of large volumes of water, which is easy to carry out and which enables to use boric acid alone as a coating agent.

To this end, the present invention is related to a process for preparing coated alkali metal percarbonate in which coating is carried out by mixing alkali metal percarbonate with at least one solid particulate coating agent and optionally with an aqueous liquid, so that the amount of water present during mixing does not exceed 12% of the total weight of the mixture. The alkali metal percarbonate is preferably sodium percarbonate.

One of the essential characteristics of the present invention resides in the use of a coating agent in the solid form. In other words, when the alkali metal percarbonate is mixed with the coating agent, this coating agent is introduced into the mixture in the solid form (or powder form or particulate form) instead of in the form of a solution or slurry. One of the advantages is that, before this mixing, it is not necessary to prepare, in a preliminary step, a solution or a slurry of the coating agent. This makes the process economically more interesting.

Another characteristic of the present invention resides in the limited amount of water present during the coating. This amount of water does generally not exceed 10%, in particular 8% of the total weight of the mixture containing the alkali metal percarbonate, the coating agent and water. This low amount of water is not sufficient to solubilize the solid coating agent. So, the coating agent particles remain solid when mixed with the percarbonate particles. It is believed that the coating takes place due to adsorption of the solid grains of coating agent on the wet or wetted surface of percarbonate particles, whereby a coating layer is formed which is sufficiently homogenous and uniform to give good stabilizing properties to the percarbonate. The amount of water present during the coating is generally at least 1.5% of the total weight of the mixture, in particular at least 3%, and preferably at least 6%

One of the advantages of the process of the invention is that boric acid alone can be used to coat efficiently percarbonate particles without having to prepare large volumes of solution. Further advantages will become clear below.

The aqueous liquid added into the mixture during coating can be pure water. Alternatively, the aqueous liquid can be an effluent recycled from another process step. For instance, the mother liquors from the crystallization of the alkali metal percarbonate can be used as aqueous liquid. In another alternative, a combination of pure water with an effluent, in particular mother liquor from the crystallization, is used.

The coating agent can be chosen from silicates, sulphates, phosphates, carbonates, borates and boric acids. Good results have been obtained with boric acids, phosphates and mixture thereof. The amount of particulate coating agent used in the process of the invention is generally at least 0.1% of the total weight of the mixture containing the alkali metal percarbonate, the coating agent and water, in particular at least 1%, and preferably at least 1.5%. The amount of particular coating agent is usually at most 15% of the total weight of the mixture, in particular at most 7%, and preferably at most 2.5%.

The coating agent used in the process of the invention preferably contains boric acid. In this case, it generally contains from 30 to 100% by weight of boric acid. It preferably contains at least 96% by weight of boric acid, in particular at least 98% by weight of boric acid. A coating agent consisting essentially of boric acid, in particular containing 100% by weight of boric acid, gives excellent results. The boric acid can be chosen from orthoboric acid, metaboric acid and tetraboric acid. Orthoboric acid is preferred.

When boric acid is used in the process of the invention, it is generally used in such a quantity that the alkali metal percarbonate is coated with at least 0.1, in particular at least 0.15% by weight of boron compared to the total weight of the coated alkali metal percarbonate. In most cases, the alkali metal percarbonate is coated with at most 0.5, in particular at most 0.2% by weight of boron compared to the total weight of the coated alkali metal percarbonate. Coating levels of about 0.3% by weight of boron give good results. When coating levels lower than 0.1% by weight of boron are used, the stabilising effect is too low for its use in detergent compositions. When coating levels higher than 0.35% of boron are used, agglomeration of the coated percarbonate particles into large particles can occur.

In the process of the invention, it is advantageous to use a coating agent powder of a granulometry which is compatible with the granulometry of the percarbonate particles so that, when mixed together, the coating agent grains can adsorb on the surface of the wet or wetted percarbonate particles. Preferably, the coating agent has a smaller particle size than the alkali metal percarbonate. The smaller the size of the coating agent particles, the better results are obtained. For instance, when the coating agent powder grains have a size which is similar to that of the percarbonate particles, adsorption will not (or at a low extent) take place. Generally, the coating agent powder particles have a mean diameter of at most 500 µm, in particular at most 250 µm, for instance at most 200 µm. The process can also be carried out with coating agent powder particles of a mean diameter of at most 150 µm. The ratio of the mean diameter of the coating agent particles to the mean diameter of the uncoated percarbonate particles is in most cases at least 0.001, in particular at least 0.01 and preferably at least 0.1. The ratio is commonly at most 1, in particular at most 0.7 and preferably at most 0.3.

The mean diameter of particles is measured according to the procedure described in the ISO standard 3118 using a series of sieves which retain the particles with a diameter smaller than respectively 75 µm, 150 µm, 250 µm, 425 µm, 600 µm, 850 µml, 1000 µm, 1180 µm and 1400 µm.

A mixture of two or more different solid particulate coating agents can be used in the process of the invention, for instance a mixture of boric acid and phosphate.

The alkali metal percarbonate which is mixed with the coating agent in the process of the invention can be any known alkali metal percarbonate.

When boric acid is used in the process of the invention, the coating can be carried out in the absence of other coating agents different from boric acid.

When boric acid is used in the process of the invention, the coating can be carried out in the absence of a solubilizing neutral salt.

In the process of the invention, the coating can be carried out at a temperature ranging from ambient temperature up to 60° C. In particular, the temperature ranges from 10 to 30° C. During coating the mixture is generally not cooled. It can be advantageous to heat up the aqueous liquid before it is added to the mixture. Heating can be done until a temperature between 45 and 65° C. is reached, and preferably between 50 and 60° C. Heating up the aqueous liquid can improve the stability of the coated percarbonate.

The duration of the coating is generally at least 10 s, in particular at least 15 s. The duration is usually at most 15 min, in particular at most 10 min. Good results are obtained with a duration ranging from 20 s to 5 min.

Mixing of the coating agent powder with the percarbonate can be carried out in any adequate mixing apparatus such as a plough share mixer. Good results are obtained when a plough share mixer of the LODIGE® type is used for the mixing.

In a first alternative of the process of the invention, the coating is carried out by using dry particles of alkali metal percarbonate containing less than 1.5% by weight of water, in particular less than 1% by weight of water, a water content of at most 0.8% by weight being most preferred.

The dry particles can, in a first variant, be obtained by a liquid crystallization process followed by a drying step. In a second variant, the dry particles can be obtained directly from a fluid bed granulation process.

According to the first variant, the process can comprise the following steps:
(1) Preparing an aqueous slurry of alkali metal percarbonate particles in a crystallizer or crystallizer-classifier. This can be done by any known liquid crystallization process.
(2) Separating the alkali metal percarbonate particles from the aqueous slurry to form a wet cake of alkali metal particles. This separation can for instance be done in a centrifuge.
(3) Drying the wet cake of alkali metal percarbonate particles to form dry alkali metal percarbonate particles containing less than 1.5% by weight of water. This drying operation can for instance be done in a fluid bed dryer.
(4) Mixing the dry alkali metal percarbonate particles with the solid coating agent and with an aqueous liquid so that the amount of water present during mixing does not exceed 12% of the total weight of the mixture, to form wet coated alkali metal percarbonate particles. This step can be carried out by first mixing the dry alkali metal percarbonate particles with the solid coating agent, and then adding the aqueous liquid to this mixture. Alternatively, this step can be carried out by mixing the dry alkali metal percarbonate particles simultaneously with the aqueous liquid and the solid coating agent.
(5) Drying the wet coated alkali metal percarbonate particles to form dry coated PCS particles containing less than 1.5% by weight of water, in particular less than 1% by weight of water, a water content of at most 0.8% by weight being most preferred;
(6) Collecting the dry coated alkali metal percarbonate particles.

In a second alternative of the process of the invention, the coating is carried out by using wet particles of alkali metal percarbonate, in particular particles which have not been dried after being prepared in a liquid crystallization process. The process can then comprise the following steps:
(1) As step (1) above;
(2) As step (2) above;
(3) mixing the wet cake of alkali metal percarbonate particles with the solid coating agent, to form a wet cake of coated alkali metal percarbonate particles. Dry alkali metal percarbonate particles can optionally be added into the mixture in order to control the water content of the mixture so that it remains below 12% of the total weight of the mixture, preferably below 10% or even 8%. This step is advantageously carried out without adding an aqueous liquid;
(4) drying the wet cake of coated alkali metal percarbonate particles to form dry coated alkali metal percarbonate particles;
(5) collecting the dry coated alkali metal percarbonate particles.

This process is particularly advantageous because there is no drying step needed between the crystallization and the coating.

The process of the invention enables to produce thermally stable coated alkali metal percarbonate which can be used as bleaching compound in detergent formulations.

Consequently, the present invention also concerns the coated alkali metal percarbonate obtainable by the process described above.

The coated alkali metal percarbonate of the invention generally presents a surface structure which is substantially in the form of plates when analysed with scanning electron microscopy (SEM) at a magnification of about 10.000. In particular, the surface structure contains only a few needles and is in particular essentially free of needles.

The coated alkali metal percarbonate of the invention has generally a mean diameter of at least 500 µm, in particular at least 550 µm. The mean diameter is usually at most 1200 µm, in particular at most 900 µm.

The coated alkali metal percarbonate of the invention presents usually an Avox of at least 12%, preferably at least 13.9% by weight. The Avox is generally at most 14.8%, in particular at most 14.6% by weight. The Avox is the available oxygen found in the alkali metal percarbonate and indicates the amount of oxygen utilisable in a chemical reaction. It is measured by titration with potassium permanganate after dissolution in sulfuric acid (see ISO 1917-1982).

The coated alkali metal percarbonate of the invention usually has a bulk density of at least 0.8, in particular at least 0.9 g/cm$^3$. It is generally at most 1.2, in particular at most 1.1 g/cm$^3$. The bulk density is measured by recording the mass of sample in a stainless steel cylinder of internal height and diameter of 86.1 mm, after running the sample out of a funnel (upper internal diameter 108 mm, lower internal diameter 40 mm, height 130 mm) placed 50 mm directly above the receiver.

The coated alkali metal percarbonate of the invention has usually a 90% dissolution time of at least 0.5, in particular at least 0.9 min. Generally. the 90% dissolution time is at most 3, in particular at most 2.5 min. The 90% dissolution time is the time taken for conductivity to achieve 90% of its final value after addition of coated alkali metal percarbonate to water at 15° C. and 2 g/l concentration. The method used is adapted from ISO 3123-1976 for industrial perborates, the only differences being the stirrer height that is 1 mm from the beaker bottom and a 2 liter beaker (internal diameter 120 mm).

The coated alkali metal percarbonate of the invention usually has an attrition measured according to the ISO standard method 5937-1980 of at least 0.05, in particular at least 0.1%. The attrition is usually at most 5, in particular at most 4%.

The coated alkali metal percarbonate of the invention usually presents a thermal stability, measured using microcalorimetry at 40° C., of at least 0.1, in particular at least 0.2 $\mu W/g$. It is most preferably at least 0.3 $\mu W/g$. It is generally at most 12, in particular at most 4 $\mu W/g$. Values of at most 3 $\mu W/g$ give good results. The measurement of thermal stability consists of using the heat flow or heat leakage principle using a LKB 2277 Thermal Activity Monitor. The heat flow between an ampoule containing the coated alkali metal percarbonate and a temperature controlled water bath is measured and compared to an inert reference material consisting of lass balls of a diameter 1-2 mm supplied by BDH Chemicals Ltd Poole England.

The coated alkali metal percarbonate of the invention can advantageously be used as active bleach constituent in detergent compositions.

The present invention therefore concerns also the use of the above described coated alkali metal percarbonate as active bleach in detergent compositions.

The present invention also concerns detergent compositions containing the above described coated alkali metal percarbonate as active bleach constituent and a builder, either zeolitic or non-zeolitic. The detergent compositions can also contain other constitutents such as surfactants, anti-redeposition and soil suspension agents, bleach activators, optical brightening agents, soil release agents, suds controllers, enzymes, fabric softening agents, perfumes, colours and processing aids.

The detergent compositions can take any form such as powders, tablets, liquids, etc.

EXAMPLES 1 AND 3 (ACCORDING TO THE INVENTION) AND 2 (COMPARATIVE)

In the example 1, sodium percarbonate (PCS) has been coated according to the process of the invention (using a boric acid powder). In the comparative example 2, PCS has been coated with a solution of boric acid. The surface structure of the coated PCS obtained in each example has then been analysed by SEM.

The characteristics of the initial uncoated sodium percarbonate are

| | |
|---|---|
| AVOX | 143.9 g/kg |
| Mean particle size | 564 μm |
| Bulk Density | 1070 g/l |

The coating is carried out in two steps. In the first step, 1 kg of uncoated PCS is mixed in a Lödige mixer M5R (series n° 1099, 5 litres capacity) under a rotation speed of 200-300 rpm. The coating agents are added continuously in the upper part of the mixer during the 2 minutes following the starting of the apparatus. The total mixing time is fixed to 5 minutes. The composition and conditions of the mixing step are:

| | Example 1: $H_3BO_3$ powder | Example 2: $H_3BO_3$ solution | Example 3: $Na_2HPO_4$ |
|---|---|---|---|
| $H_3BO_3$ or $Na_2HPO_4$ (% w/w in total mix) | 1.7 | 1.7 | 1.8 |
| Water (% w/w in total mix) | 8 | 8 | 8 |
| Temperature of mixer (° C.) | Ambient | Ambient | Ambient |

In example 1, $H_3BO_3$ in powder form and water are added in the mixer separately, in the same time at ambiant temperature on the dry product. In example 2, $H_3BO_3$ is dissolved in the water at 70° C. and added in the mixer on the dry product. In example 3, $Na_2HPO_4$ in powder form and water are added in the mixer separately in the same time at ambiant temperature on the dry product.

In the second step of the process, the wet cake coming from the mixer is transferred in a lab fluid bed dryer (Aeromatic Fielder Strea 1, series n° 9799-0710). The conditions of drying step are:

| | Example 1: $H_3BO_3$ powder | Example 2: $H_3BO_3$ solution | Example 3: $Na_2HPO_4$ |
|---|---|---|---|
| Temperature of air (° C.) | 70 | 70 | 70 |
| Drying time (min) | 30 | 30 | 30 |
| Pressure (bar) | 4 | 4 | 4 |
| Air flow (m³/h) | 100 | 100 | 100 |

Figure 2:

The product is removed from the dryer after cooling under 40° C. FIG. 1 shows the SEM picture (magnification of 10,000) obtained by analysing the coated PCS of example 1. FIG. 2 shows the same for example 2. The SEM pictures were taken with a microscope LEO 982. Before SEM analysis, the samples were treated by depositing thereon a 30 nm carbon layer (by evaporation of carbone).

The coated PCS of example 3 presented an available oxygen content of 14.2% by weight and a mean diameter of 751 μm.

EXAMPLE 4 (ACCORDING TO THE INVENTION)

The coated sodium percarbonate of example 1 has been incorporated in a tablet detergent formulation suitable for dish washing. The detergent composition contains a compressed portion and a non-compressed portion which is coated with a coating layer. The different portions have the following composition:

Compressed portion (20.0 g): tri-sodium citrate dihydrate : 26.4% wt
  amorphous sodium silicate ($SiO_2$:$Na_2O$ ratio=1.6-3.2): 26.4% wt
  amylolytic enzyme: 0.6% wt
  coated sodium percarbonate : 8.48% wt
  nonionic surfactant: 1.5% wt
  tetraacetyl ethylene diamine (TAED): 4.33% wt ethane 1-hydroxy-1,1-diphosphonic acid (HEDP): 0.67% wt diethyltriamine penta (methylene) phosphonate (DE-TPMP): 0.65% wt
paraffin: 0.42% wt
benzotriazole (BTA): 0.24% wt
polyacrylic acid of average molecular weight approximately 4,500: 3.2% wt
anhydrous sodium sulphate: 24.05% wt
Non-compressed portion (5.0 g): proteolytic enzyme 12.8% wt
amylolytic enzyme: 7.2% wt
tri-sodium citrate dihydrate: 35.0% wt
amorphous sodium silicate ($SiO_2$:$Na_2O$ ratio=1.6-3.2): 42.0% wt
Coating layer (1.0 g) starch 15.0% wt
C12 dicarboxylic acid: 85.0% wt

EXAMPLE 5 (ACCORDING TO THE INVENTION)

The coated sodium percarbonate of example 1 has been incorporated in a tablet detergent formulation suitable for bleaching cloths. The detergent tablets have the following composition:
Linear alkylbenzene sulphonate: 7.20% wt
nonionic surfactant: 3.08% wt
soap: 1.95% wt
zeolite 4A : 30.38% wt
polymer (acrylic/maleic): 4.58% wt
sodium alkaline silicate: 0.53% wt
sodium carboxymethylcellulose : 0.68% wt
minor ingredients : 2.03% wt
moisture: 13.50% wt
coated sodium percarbonate: 22.75% wt
TAED:2.25% wt

EXAMPLE 6 (ACCORDING TO THE INVENTION)

The coated sodium percarbonate of example 1 has been incorporated in a powder detergent formulation. The detergent powder has the following composition:
Base (8.75 g):sodium linear alkylbenzene sulphonate 16.8% wt
nonionic surfactant: 7.5% wt
anhydrous zeolite: 44.8% wt
acrylic/melaic copolymer: 7.5% wt
sodium carbonate: 3.7% wt
minor ingredients: 2.9% wt
moisture: 16.8% wt
coated sodium percarbonate: 1.25 g

EXAMPLE 7 (ACCORDING TO THE INVENTION)

The coated sodium percarbonate of example 1 has been incorporated in a liquid detergent formulation suitable for laundering/bleaching. The detergent liquid has the following composition:
Base (100 g): sodium salt of linear alkyl benzene sulfonate: 16% wt
C11 alcohol ethoxylate: 21% wt
Butoxy-propoxy-propanol: 19% wt
sodium citrate: 4% wt
[4-[N-nonanoyl-6-aminohexanoyloxy]benzene sulfonate] sodium salt: 6% wt
chloride salt of methyl quarternized polyethoxylated hexamethylene diamine: 1.2% wt
ethylenediamine disuccinic acid: 1% wt
sodium carbonate: 7% wt
maleic-acrylic copolymer: 3% wt
protease: 0.40% wt
amylase: 0.8% wt
cellulase: 0.50% wt
suds suppressor: 1.5% wt
perfume: 0.5% wt
titanium dioxide: 0.5% wt
brightener: 0.14% wt
thixatrol ST: 0.1% wt
Speckles: 0.4% wt
miscellaneous: remainder
coated sodium percarbonate: 168 g

EXAMPLE 8 (ACCORDING TO THE INVENTION)

The coating is carried out in two phases. In the first step wet Sodiumcarbonate peroxihydrate is taken from the plant after the centrifuge. The moisture of the wet PCS is 9.1% $H_2O$. 2-2.5 kg of this product is filled in a LÖDIGE mixer M5 (ploughshare mixer, 5 liter capacity) and mixed at 250 (±50) RPM. The boric acid is added continuously in the upper part of the mixer during 1-2 minutes following the starting of the apparatus. After adding the coating agent, the mixing time is about 1 minute.

|  | H3BO3 (solid) |
| --- | --- |
| H3BO3 (% w/w in total mix) | 2.5 |
| H2O (% w/w in total mix) | 8.9 |
| Temperature of mixer | ambient |

The used boric acid powder (Optibor SP, BORAX) has a particle size distribution of <3.0% on 250 μm sieve and a H3BO3 content of 99.9-100.7%.

In a second step of the process, the wet, coated PCS coming from the mixer is transferred in a lab fluid bed dryer (GLATT, WSG 1, Com. No. 3198). The conditions of the drying step are:

|  | H3BO3 (solid) |
| --- | --- |
| Temperature of inlet air (° C.) | 90-100 |
| Temperature of outlet air (° C.) | 85 |
| Air flow ($m^3$/h) | 150 |
| Drying time (min) | 7-13 |

The warm product is removed from the dryer and cooled under ambiant conditions.

Results:

|  | H3BO3 (solid) |
| --- | --- |
| Available oxygen (%) | 14.04 |
| Coatinglevel (%) | 2.5 |
| Boron (%) | 0.43 |
| LKB in base powder (μW/g) | 4.3 |

The product shows at a coating level of 2.5% good results in the LKB value which is determined by a microcalorimeter LKB 2277 Bio Activity Monitor. The available oxygen content is determined by permanganometric titration, the boron content by ICP (SPECTRO, SPECTROFlame No. 2308/89).

EXAMPLE 9 (ACCORDING TO THE INVENTION)

The coating is carried out in two phases. In the first step dry Sodiumcarbonate per-oxihydrate is taken from the plant after the dryer. 2-2.5 kg of this product is filled in a LÖDIGE mixer M5 (ploughshare mixer, 5 liter capacity) and mixed at 250 (±50) RPM. The borate/silicate solution is added continuously in the upper part of the mixer during 1-2 minutes following the starting of the apparatus. After adding the coating agent, the mixing time is about 1 minute.

|  | Borate/silicate solution |
| --- | --- |
| Coating (% w/w in total mix) | 2.8 |
| $H_2O$ (% w/w in total mix) | 3.4 |
| Temperature of mixer | ambient |

The used borate silicate solution is composed of 129 g/kg $Na_2O$, 53 g/kg $SiO_2$, 43 g/kg B with a total solid content of 460 g/kg.

In a second step of the process, the wet, coated PCS coming from the mixer is transferred in a lab fluid bed dryer (GLATT, WSG 1, Com. No. 3198). The conditions of the drying step are:

|  | Borate/silicate solution |
| --- | --- |
| Temperature of inlet air (° C.) | 90-100 |
| Temperature of outlet air (° C.) | 85 |
| Air flow (m³/h) | 150 |
| Drying time (min) | 7-13 |

The warm product is removed from the dryer and cooled under ambiant conditions.

Results:

|  | Borate/silicate solution |
| --- | --- |
| Available oxygen (%) | 13.96 |
| Coatinglevel (%) | 2.8 |
| Boron (%) | 0.26 |
| LKB in base powder (µW/g) | 11 |

The LKB value is determined by a microcalorimeter LKB 2277 Bio Activity Monitor. The available oxygen content is determined by permanganometric titration, the boron content by ICP (SPECTRO, SPECTROFlame No. 2308/89).

EXAMPLE 10 (ACCORDING TO THE INVENTION)

The coating is carried out in two phases. In the first step dry Sodiumcarbonate peroxihydrate is taken from the plant after the dryer. 2 kg of this product, 10% PCS-dust and the boric acid are filled in a LÖDIGE mixer M5 (ploughshare mixer, 5 liter capacity) and mixed at 250 (±50) RPM. PCS-mother liquor is added continuously in the upper part of the mixer during 1-2 minutes following the starting of the apparatus. After adding the mother liquor, the mixing time is about 1 minute.

|  | $H_3BO_3$ (solid) |
| --- | --- |
| Coating (% w/w in total mix) | 1.8 |
| $H_2O$ (% w/w in total mix) | 5.1 |
| Temperature of mixer | ambient |

The used boric acid powder (Optibor SP, BORAX) has a particle size distribution of <3.0% on 250 µm sieve and a $H_3BO_3$ content of 99.9-100.7%.

The analysis of the PCS-dust shows an available oxygen of 13.7%.

In a second step of the process, the wet, coated PCS coming from the mixer is transferred in a lab fluid bed dryer (GLATT, WSG 1, Com. No. 3198). The conditions of the drying step are:

|  | $H_3BO_3$ (solid) |
| --- | --- |
| Temperature of inlet air (° C.) | 90–100 |
| Temperature of outlet air (° C.) | 85 |
| Air flow (m³/h) | 150 |
| Drying time (min) | 7–13 |

The warm product is removed from the dryer and cooled under ambiant conditions.

Results:

|  | $H_3BO_3$ (solid) |
| --- | --- |
| Available oxygen (%) | 13.97 |
| Coatinglevel (%) | 1.8 |
| Boron (%) | 0.32 |
| LKB in base powder (µW/g) | 3.4 |

The product shows at a coating level of 1.8% good results in the LKB value which is determined by a microcalorimeter LKB 2277 Bio Activity Monitor. The available oxygen content is determined by permanganometric titration, the boron content by ICP (SPECTRO, SPECTROFlame No. 2308/89).

EXAMPLE 11 (ACCORDING TO THE INVENTION)

The same operations as in example 1 have been carried out using an initial uncoated sodium percarbonate having:

| Avox = | 14.7% by weight |
| --- | --- |
| mean particle size = | 634 µm |
| bulk density = | 990 g/ml |

The conditions of the first mixing step were:

| $H_3BO_3$ (% w/w in total mix) = | 0.97 |
| --- | --- |
| $Na_3PO_4$ (% w/w in total mix) = | 2.33 |

| | |
|---|---|
| water (% w/w in total mix) = | 8 |
| Temperature of mixer = | Ambient |

The second step has been carried out as in example 1. The coated PCS presented an available oxygen content of 14.0% w/w and a mean particle size of 905 μm.

The invention claimed is:

1. A process for making coated alkali metal percarbonate particles consisting of:

mixing an alkali metal percarbonate with at least one particulate coating agent composition in solid form to form a mixture wherein the coating agent composition comprises a coating agent selected from the group consisting of orthoboric acid, metaboric acid, tetraboric acid, phosphates, sulfates and carbonates and is present in an amount of less than 15% of the total weight of the mixture, wherein the amount of water present during mixing is at least 1.5% and no more than 8% by weight of the total weight of the mixture, and wherein said mixing step is performed without carrying out, before mixing, a preliminary preparation of a solution or a slurry of the coating agent.

2. The process according to claim 1, wherein the coating agent composition comprises at least one of orthoboric acid, metaboric acid, and tetraboric acid.

3. The process according to claim 2, wherein the coating agent composition comprises at least 96% by weight of one of orthoboric acid, metaboric acid, tetraboric acid and mixtures thereof.

4. The process according to claim 1, wherein the amount of the coating agent composition is at most 7% of the total weight of the mixture.

5. The process according to claim 2, wherein a coated alkali metal percarbonate comprising from 0.1 to 0.5% by weight of boron is formed.

6. The process according to claim 1, wherein the solid particulate coating agent composition comprises a particulate coating agent having a mean diameter of at most 500 μm.

7. The process according to claim 1, wherein the alkali metal percarbonate comprises less than 1.5% by weight of water.

8. A process for making coated alkali metal percarbonate particles consisting of:

mixing dry alkali metal percarbonate particles comprising less than 1.5% by weight of water with at least one particulate coating agent composition in solid form in the presence of an amount of water which does not exceed 8% of the total weight of the mixture, wherein the coating agent composition comprises a coating agent selected from the group consisting of orthoboric acid, metaboric acid, tetraboric acid, phosphates, sulfates, and carbonates and is present in an amount of less than 15% of the total weight of the mixture, to form wet coated alkali metal percarbonate particles;

drying the wet coated alkali metal percarbonate particles to form dry coated alkali metal percarbonate particles containing less than 1.5% by weight of water; and collecting the dry coated alkali metal percarbonate particles, wherein the amount of water present during mixing is at least 1.5% and no more than 8% by weight of the total mixture, and wherein said mixing step is performed without carrying out, before mixing, a preliminary preparation of a solution or a slurry of the coating agent.

9. The process according to claim 8, wherein mixing is carried out by first mixing the dry alkali metal percarbonate particles with the solid coating agent composition, and then adding water.

10. The process according to claim 8, wherein mixing is carried out by mixing the dry alkali metal percarbonate particles simultaneously with water and the coating agent composition.

11. The process according to claim 1, wherein the alkali metal percarbonate is in the form of wet particles.

12. A process for making coated alkali metal percarbonate particles consisting of:

mixing a wet cake of alkali metal percarbonate particles with at least one particulate coating agent composition in solid form and optionally with dry alkali metal percarbonate particles, to form a wet cake of coated alkali metal percarbonate particles wherein the coating agent composition comprises a coating agent selected from the group consisting of orthoboric acid, metaboric acid, tetraboric acid, phosphates, sulfates, and carbonates and is present in an amount of less than 15% of the total weight of the mixture;

drying the wet cake of coated alkali metal percarbonate particles to form dry coated alkali metal percarbonate particles; and collecting the dry coated alkali metal percarbonate particles, wherein the amount of water present during mixing is at least 1.5% and no more than 8% by weight of the total mixture, and wherein said mixing step is performed without carrying out, before mixing, a preliminary preparation of a solution or a slurry of the coating agent.

13. The process according to claim 1, wherein the alkali metal percarbonate is mixed with the solid particulate coating agent in the presence of an aqueous liquid.

14. The process according to claim 3, wherein the coating agent composition comprises 100% by weight of one of orthoboric acid, metaboric acid, tetraboric acid and mixtures thereof.

15. The process according to claim 2, wherein a coated alkali metal percarbonate comprising from 0.15% to 0.3% by weight of boron is formed.

16. The process according to claim 1, wherein the solid particulate coating agent has a mean diameter of at most 250 μm.

17. The process according to claim 1, wherein the alkali metal percarbonate is in the form of dry particles obtained by fluid bed granulation.

18. The process according to claim 1, wherein the coating agent is orthoboric acid.

19. The process according to claim 1, wherein the coating agent is metaboric acid.

20. The process according to claim 1, wherein the coating agent is tetraboric acid.

21. A process for making coated alkali metal percarbonate particles consisting of:

mixing an alkali metal percarbonate with a dry composition consisting of a single particulate coating agent in solid form to form a mixture without carrying out, before mixing, a preliminary preparation of a solution or a slurry of the coating agent wherein the coating agent is present in an amount of less than 15% of the total weight of the mixture, wherein the amount of water present during mixing is at least 1.5% and no more than 8% by weight of the total weight of the mixture.

22. The process according to claim 21, wherein the coating agent is orthoboric acid.

23. The process according to claim 21, wherein the coating agent is metaboric acid.

24. The process according to claim 21, wherein the coating agent is tetraboric acid.

25. The process according to claim 1, wherein the amount of water present during mixing is at least 1.5% and no more than 5.1% by weight of the total weight of the mixture.

26. The process according to claim 8, wherein the dry alkali metal percarbonate particles are mixed with the particulate coating agent composition in the presence of an amount of water which does not exceed 5.1% of the total weight of the mixture, to form wet coated alkali metal percarbonate particles.

27. The process according to claim 21, wherein the amount of water present during mixing is at least 1.5% and no more than 5.1% by weight of the total weight of the mixture.

28. A process for making coated alkali metal percarbonate particles consisting of:

mixing an alkali metal percarbonate with a particulate coating agent composition in solid form to form a mixture wherein the coating agent is present in an amount of less than 15% of the total weight of the mixture, wherein the amount of water present during mixing is at least 1.5% and no more than 8% by weight of the total weight of the mixture, wherein said mixing step is performed without carrying out, before mixing, a preliminary preparation of a solution or a slurry of the coating agent, and wherein the coating agent composition consists of boric acid.

* * * * *